(12) United States Patent
Fukuda et al.

(10) Patent No.: US 11,502,367 B2
(45) Date of Patent: Nov. 15, 2022

(54) BATTERY CASE

(71) Applicant: FDK CORPORATION, Tokyo (JP)

(72) Inventors: Yunosuke Fukuda, Tokyo (JP); Naoto Kawaguchi, Tokyo (JP); Atsushi Metsugi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 78 days.

(21) Appl. No.: 16/765,109

(22) PCT Filed: Nov. 15, 2018

(86) PCT No.: PCT/JP2018/042353
§ 371 (c)(1),
(2) Date: May 18, 2020

(87) PCT Pub. No.: WO2019/111668
PCT Pub. Date: Jun. 13, 2019

(65) Prior Publication Data
US 2020/0350526 A1    Nov. 5, 2020

(30) Foreign Application Priority Data

Dec. 5, 2017  (JP) .............................. JP2017-233484

(51) Int. Cl.
*H01M 50/262*    (2021.01)
*H01M 50/247*    (2021.01)
(Continued)

(52) U.S. Cl.
CPC ....... *H01M 50/262* (2021.01); *H01M 50/202* (2021.01); *H01M 50/216* (2021.01);
(Continued)

(58) Field of Classification Search
None
See application file for complete search history.

(56) References Cited

U.S. PATENT DOCUMENTS

| | | |
|---|---|---|
| 5,263,577 A | 11/1993 | Paratte et al. |
| 2003/0137488 A1 | 7/2003 | Haraguchi |

FOREIGN PATENT DOCUMENTS

| | | |
|---|---|---|
| CA | 2300385 | 3/2000 |
| CN | 1434524 A | 8/2003 |

(Continued)

OTHER PUBLICATIONS

EPO website (www.espacenet.com) machine translation of the detailed description of JP 2008-097958A. (Year: 2008).*

(Continued)

*Primary Examiner* — Gregg Cantelmo
(74) *Attorney, Agent, or Firm* — Kinney & Lange, P.A.

(57) ABSTRACT

Provided is a battery case for accommodating a coin cell battery which is inserted thereinto in a sliding manner. The battery case includes: a battery case body part which includes an opening for accommodating the coin battery and in which the accommodated coin cell battery is held; and a lid part which closes the opening of the battery case body part. The lid part includes a claw part which, upon closing of the opening, is fitted and inserted into the battery case body part, and with which, upon removal of the coin cell battery held in the battery case body part, the coin battery is pushed out in a direction opposite to a direction of insertion.

8 Claims, 8 Drawing Sheets

(51) Int. Cl.
  *H01M 50/271*  (2021.01)
  *H01M 50/202*  (2021.01)
  *H01M 50/216*  (2021.01)

(52) U.S. Cl.
  CPC ....... *H01M 50/247* (2021.01); *H01M 50/271* (2021.01); *H01M 2220/30* (2013.01)

(56) References Cited

FOREIGN PATENT DOCUMENTS

| | | | |
|---|---|---|---|
| EP | 1107337 | A2 | 6/2001 |
| JP | 54-166534 | U | 11/1979 |
| JP | 4-31259 | U | 3/1992 |
| JP | 0431259 | U | 3/1992 |
| JP | H09180694 | A | 7/1997 |
| JP | 07183013 | A | 7/2003 |
| JP | 2004022451 | A | 1/2004 |
| JP | 2008097958 | A * | 4/2008 |
| JP | 2015170517 | A | 9/2015 |
| TW | 457784 | B | 10/2001 |
| TW | 201603355 | A | 1/2016 |
| WO | 2014/006665 | A1 | 1/2014 |

OTHER PUBLICATIONS

Extended European Search Report dated Jul. 8, 2021, received for corresponding European Application No. 18884996.2, eight pages.
International Search Report and Written Opinion dated Feb. 5, 2019, for corresponding PCT Application No. PCT/JP2018/042353.

\* cited by examiner

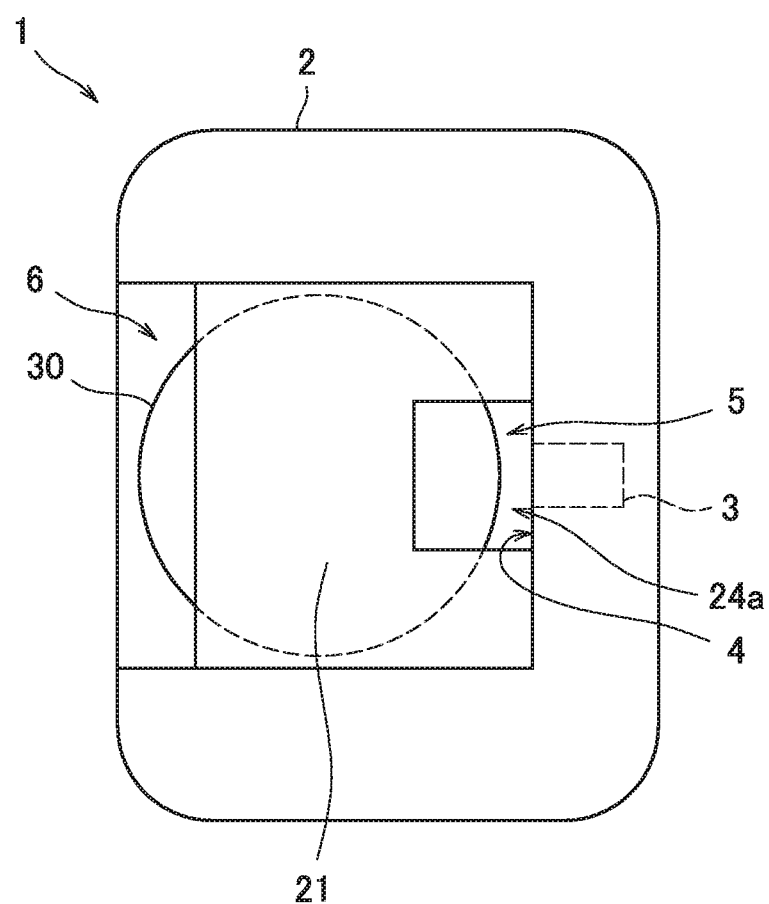

BATTERY CASE

CROSS-REFERENCE TO RELATED APPLICATION(S)

This application is the national phase of PCT Application No. PCT/JP2018/042353 filed on Nov. 15, 2018, which in turn claims priority to Japanese Application No. 2017-233484 filed on Dec. 5, 2017, both of which are incorporated by reference herein in their entireties.

TECHNICAL FIELD

The present disclosure relates to a battery case having a battery removal function, and specifically to a battery case including a lid part with which a held coin cell battery can be pushed out to a removal position.

BACKGROUND

As power sources for various compact electronic devices, flat-type batteries such as coin cell batteries, button cell batteries or the like are used. These electronic devices are provided with battery cases for accommodating a battery in order to be loaded with the battery. Typically, the battery case includes a battery holder which holds a battery therein, and an opening used for insertion and removal of the battery. In addition, the battery case is structured such that a cover (lid part) closes the opening to prevent movement and dropping-off of the battery or damage caused by impact from an outside or the like.

On the other hand, in the case of a flat-type battery, a battery holder is used which is, because of the thin and flat shape of the battery, configured so that the battery is inserted into and removed from region between electrical contacts disposed in an upper and a lower sides of the battery holder, in a sliding manner in a lateral direction through an insertion opening laterally provided to the battery holder. With this lateral-sliding-type battery holder, insertion of the battery may be easy, but removal of the battery may not be easy, because the battery holder has a battery dropping-off prevention mechanism for holding the battery, such as pressing the battery with a flexible projection part. Therefore, an arrangement is necessary to remove the battery held in the battery holder from the dropping-off prevention mechanism and to slide the battery in a direction opposite to a direction of insertion.

For example, a typical battery holder as described in Patent Document 1 includes an open end surface for insertion of a battery, and a cut-out extending toward the open end surface from a side surface opposite to the open end surface to a portion of the battery. The battery holder is configured so that when inserting the battery therein, the battery is pushed into the battery holder from the open end surface, and when removing the battery therefrom, the battery is pushed out toward the open end surface from the cut-out part using a removal tool.

PRIOR ART DOCUMENT

Patent Document

Patent Document 1: Japanese Patent Laid-Open No. 2015-170517

SUMMARY

However, battery holders, such as the battery holder described above, each need a special tool therefor which matches a structure of the cut-out part thereof. Especially in a case where the battery holder is fixed to a battery case or an electronic device, a space for removal of the battery is limited depending on the shapes and positional relationship of electronic parts placed around the battery holder. Accordingly, even the special tool which matches the structure of a battery holder may not be able to be used for the battery holder depending on the battery case or the electronic device used therewith. In such a case, special tools each of which matches a corresponding battery case or electronic device are needed, resulting in further increase in cost. In addition, the special tool is needed to be kept with the electronic device having the battery holder in a controlled manner, resulting in a complicated operation.

In view of this situation, an object of the present disclosure is to provide a battery case which allows easy removal of a coin cell battery held in a battery holder without using a special removal tool.

A first aspect of the present disclosure is directed to provide a battery case for accommodating a coin cell battery inserted thereinto in a sliding manner. The battery case includes: a battery case body part which includes an opening for accommodating the coin cell battery and in which the accommodated coin cell battery is held; and a lid part which closes the opening of the battery case body part. The lid part includes a claw part which is fitted and inserted into the battery case body part upon closing of the opening, and with which the coin cell battery held in the battery case body part is pushed out in a direction opposite to a direction of insertion upon removal of the coin cell battery.

According to the present disclosure, the lid part closes the opening of the battery case body part for accommodating the battery, and is fixed to the battery case body part with the claw part included in the lid part, which enables prevention of movement and dropping-off of the coin cell battery as well as damage caused by impact from an outside or the like. Furthermore, the claw part of the lid part separated from the battery case body part are inserted into a space disposed in the battery case body part, the coin cell battery is pushed out in the direction opposite to the direction of insertion with the claw part, and thereby the coin cell battery can be easily removed without a special tool.

In this way, a unique advantage in which there is provided a low-cost battery case allowing easy replacement of batteries while avoiding malfunction caused by movement and dropping-off of a battery as well as damage caused by impact from an outside or the like can be obtained.

BRIEF DESCRIPTION OF THE DRAWINGS

FIG. 9 is a plan view of a battery case of a modification of the present disclosure.

DETAILED DESCRIPTION

Hereinafter, an embodiment of the present disclosure will be described with reference to the drawings.

Embodiment

Figure 1:
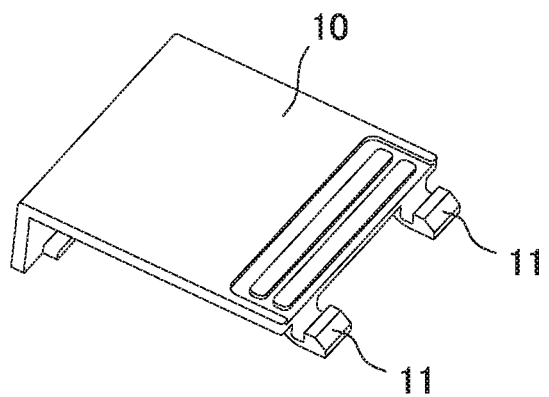
FIG. 1 is a perspective view of a lid part of a battery case according to an embodiment of the present disclosure.
Figure 2:
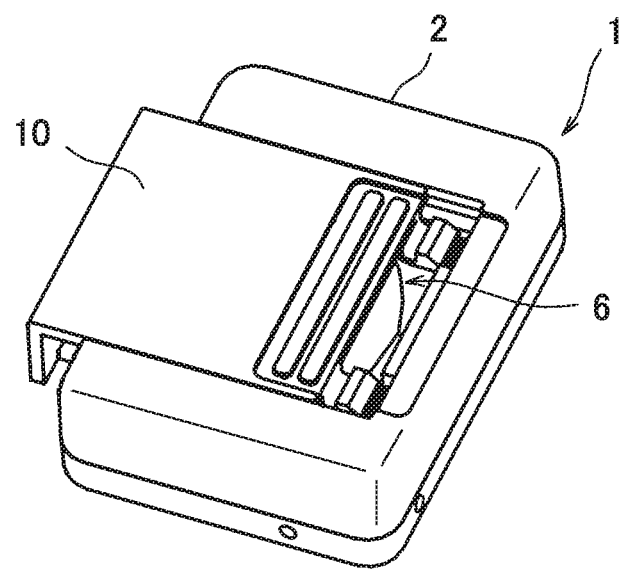
FIG. 2 is a perspective view of the battery case according to the embodiment of the present disclosure in a state in which the lid part of the battery case closes an opening.
Figure 3:
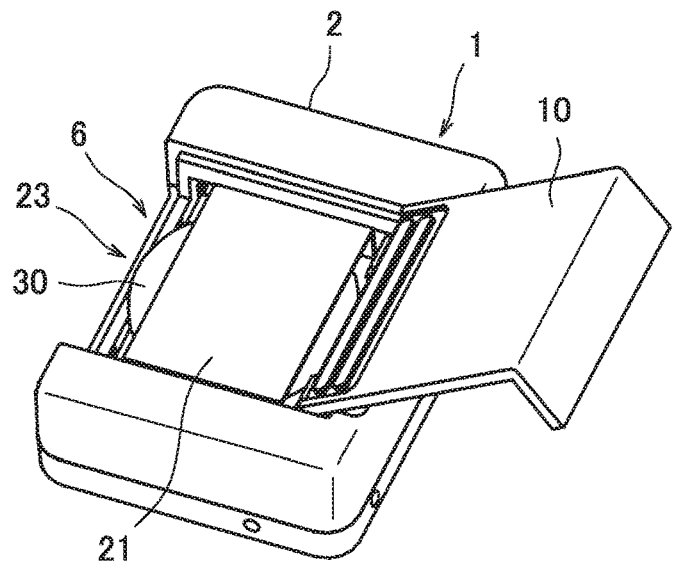
FIG. 3 is a perspective view of the battery case according to the embodiment of the present disclosure in a state in which a battery is removed with the lid part.

FIGS. 1 to 3 are perspective views of a battery case 1 according to an embodiment of the present disclosure. The battery case 1 according to the embodiment of the present disclosure includes a battery case body part 2 and a lid part 10. The battery case body part 2 includes an opening 6 for accommodating a coin cell battery such that the lid part 10 can close the opening 6.

The lid part 10 includes two claw parts 11 laterally protruding from one side surface of the lid part 10 (FIG. 1). The lid part 10, by fitting and inserting the claw parts 11 into locking holes (not shown) disposed in the battery case body part 2, closes the opening 6 and is fixed to the battery case body part 2 (FIG. 2).

On the other hand, upon removal of the battery as illustrated in FIG. 3, the lid part 10 is removed from the battery case body part 2, the claw parts 11 thereof are inserted into spaces disposed facing the locking holes in the battery case body part so as to push out a coin cell battery 30 toward an insertion opening 23, and thereby the coin cell battery 30 can be removed. In this way, the claw parts 11 have a pushing-out function to remove the coin cell battery 30 in addition to a function of fixing of the lid part 10. Accordingly, the claw parts 11 are formed so as to have enough mechanical strength necessary to achieve the functions.

Figure 4:
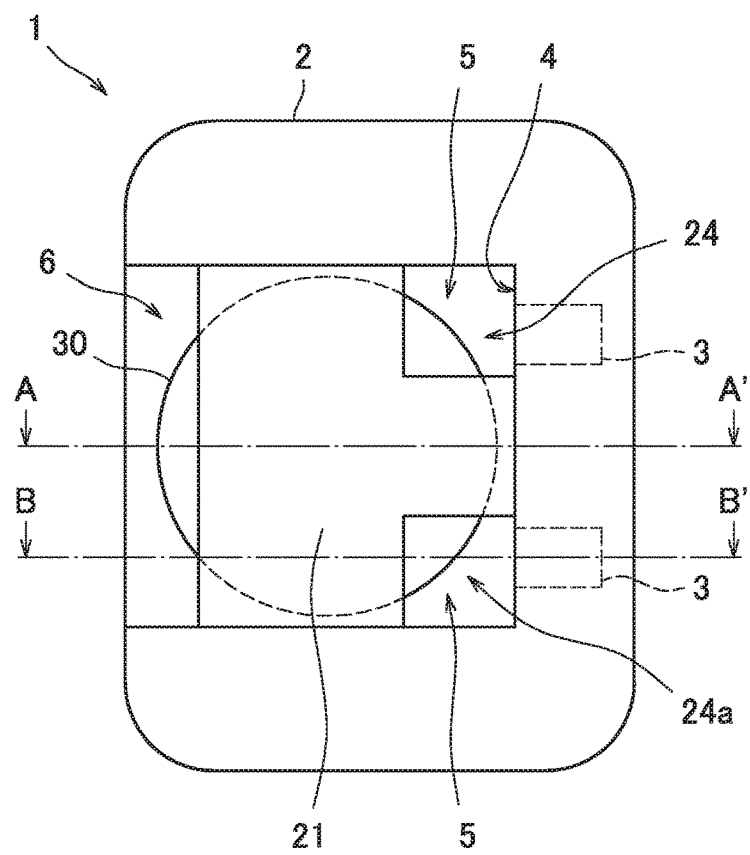
FIG. 4 is a plan view of the battery case according to the embodiment of the present disclosure.
Figure 5:
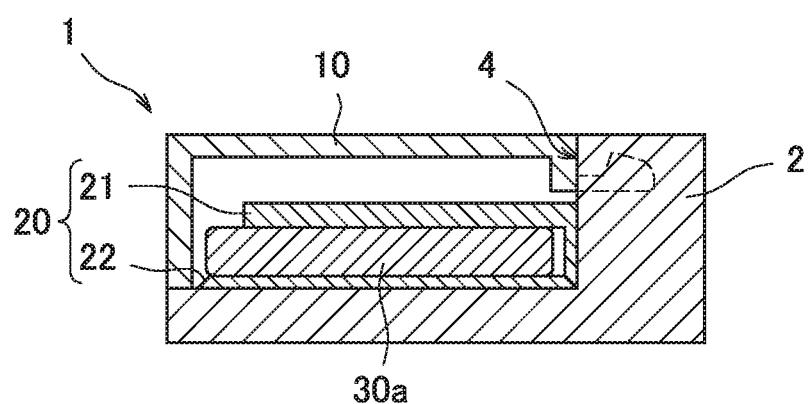
FIG. 5 is a cross-sectional view of the battery case according to the embodiment of the present disclosure taken along line A-A' illustrated in FIG. 4.
Figure 6:
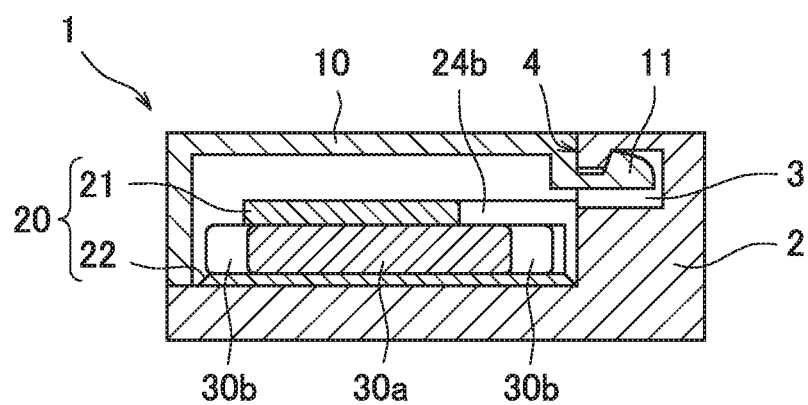
FIG. 6 is a cross-sectional view of the battery case according to the embodiment of the present disclosure taken along line B-B' illustrated in FIG. 4.

FIG. 4 is a plan view of the embodiment of the present disclosure. FIG. 5 is a cross-sectional view taken along line A-A' illustrated in FIG. 4, and FIG. 6 is a cross-sectional view taken along line B-B' illustrated in FIG. 4.

The battery case body part 2 illustrated in FIG. 5 includes a battery holder 20 which is integrally formed with the battery case body part 2 and includes a first holding part 21 and a second holding part 22. Here, the second holding part 22 is fixed to the battery case body part 2. The battery holder 20 holds a coin cell battery 30a with the first holding part 21 and the second holding part 22. It should be noted that one of the first holding part 21 or the second holding part 22 may include a flexible projection part which allows holding of the coin cell battery 30 by pressing, or that both the first holding part 21 and the second holding part 22 may include flexible projection parts which allow holding of the coin cell battery 30 by pressing.

In addition, the lid part 10 can entirely close the opening 6 of the battery case body part 2 to protect the held coin cell battery 30. As illustrated in FIG. 6, the claw parts 11, which laterally protrude from the one side surface of the lid part 10, are fitted and inserted into locking holes 3 included in an inside surface of the battery case body part 2, and thereby the lid part 10 is fixed to the battery case body part 2.

On the other hand, as illustrated in FIG. 4, in an inside surface 4 of the battery case body part 2, when the one side surface of the lid part 10 is fixed facing the inside surface 4, the locking holes 3 are disposed at positions matching positions of the claw parts 11. Here, the two claw parts 11 are formed at a position where the two claw parts 11 are symmetric with each other with respect to a center of the one side surface of the lid part 10. Accordingly, when the claw parts 11 are inserted inside the opening 6 of the battery case body part 2 along the inside surface 4 such that the one side surface of the lid part 10 has a width matching the width of the inside surface 4, the claw parts 11 reach positions facing the locking holes 3. At this time, even in a state in which the coin cell battery 30 is held, spaces 5 which allow the claw parts 11 to be inserted thereinto are left between the inside surface 4 and the coin cell battery 30 such that the claw parts 11 can be smoothly inserted.

In addition, the first holding part 21 of the battery holder 20 includes cut-outs 24a disposed facing and close to the locking holes 3 so as not to cover the spaces 5. The cut-outs 24a make parts of the coin cell battery 30 be exposed so that the coin cell battery 30 can be pushed out to a removable position with the claw parts 11 inserted into the spaces 5.

Next, procedures of insertion and removal of the coin cell battery 30 in the battery case 1 having the structure described above will be explained with reference to FIGS. 7A to 7D, and FIGS. 8A to 8D. These figures are all cross-sectional views taken along line B-B' illustrated in FIG. 4

Figure 7A:
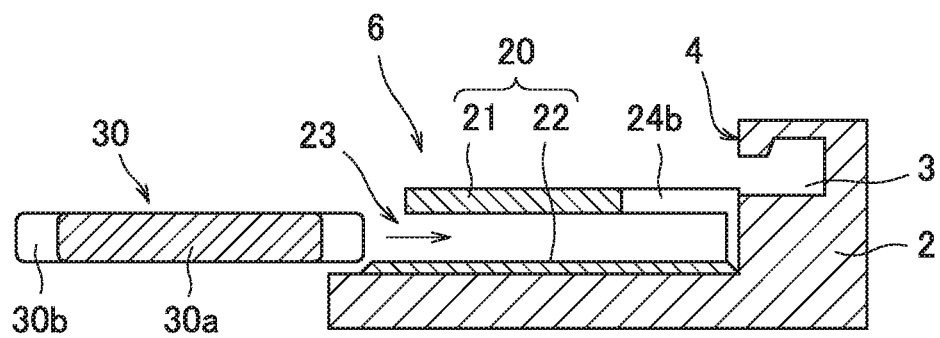
FIG. 7A is a cross-sectional view of the battery case according to the embodiment of the present disclosure taken along line A-A' illustrated in FIG. 4, illustrating a placement procedure of the battery into a battery holder.
Figure 7B:
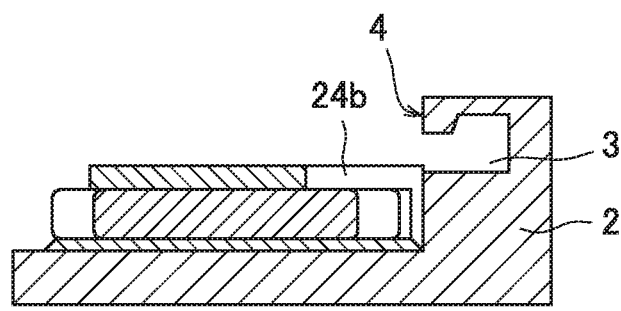
FIG. 7B is a cross-sectional view of the battery case according to the embodiment of the present disclosure taken along line A-A' illustrated in FIG. 4, illustrating the placement procedure of the battery into the battery holder.

FIG. 7A illustrates the battery case body part 2 without the lid part 10 and with the opening 6 being kept open. Reference character 24b in the drawings denotes a side surface of a cut-out part of the first holding part 21. The coin cell battery 30 is inserted from the insertion opening 23 being lateral to the battery holder 20, and pushed in a direction of insertion in a sliding manner to a holding position illustrated in FIG. 7B.

Figure 7C:
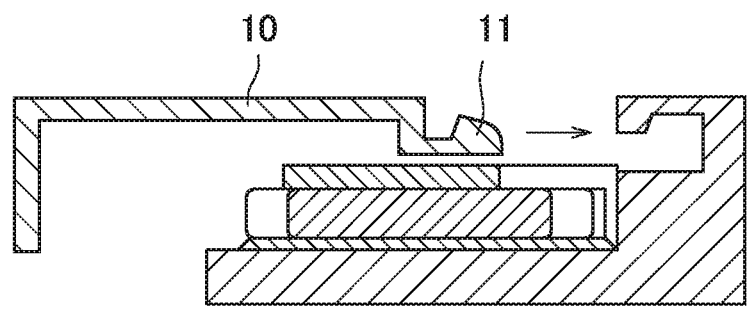
FIG. 7C is a cross-sectional view of the battery case according to the embodiment of the present disclosure taken along line A-A' illustrated in FIG. 4, illustrating the placement procedure of the battery into the battery holder.

Next, as illustrated in FIG. 7C, the lid part 10 is slid laterally with respect to the battery case body part 2 along the opening 6, the claw parts 11 are fitted and inserted into the locking holes 3, and thereby the lid part 10 is fixed to the battery case body part 2. Due to this, the opening 6 of the battery case body part 2 is closed, leading to a state in which the coin cell battery 30 is accommodated in the battery case 1 as illustrated in FIG. 7D.

Figure 7D:
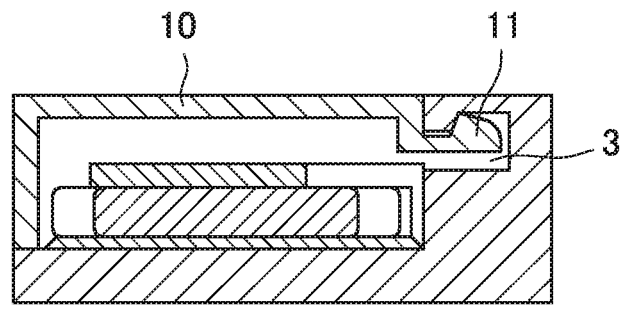
FIG. 7D is a cross-sectional view of the battery case according to the embodiment of the present disclosure taken along line A-A' illustrated in FIG. 4, illustrating the placement procedure of the battery into the battery holder.
Figure 8A:
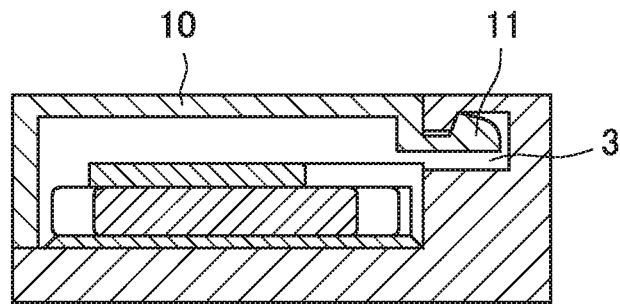
FIG. 8A is a cross-sectional view of the battery case according to the embodiment of the present disclosure taken along line A-A' illustrated in FIG. 4, illustrating a removal procedure of the battery using the lid part.
Figure 8B:
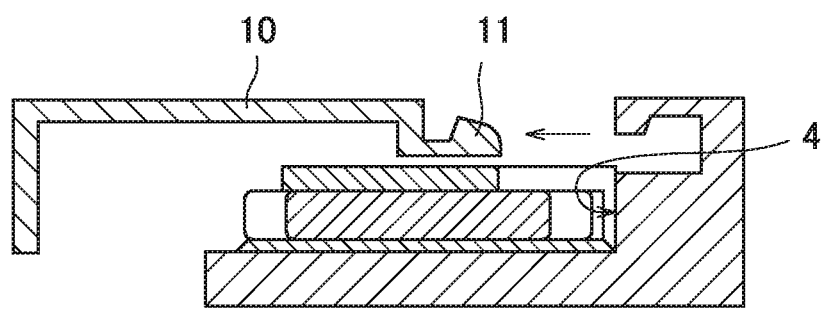
FIG. 8B is a cross-sectional view of the battery case according to the embodiment of the present disclosure taken along line A-A' illustrated in FIG. 4, illustrating the removal procedure of the battery using the lid part.

FIG. 8A is the same figure as FIG. 7D, illustrating the state in which the coin cell battery 30 is accommodated in the battery case 1. Here, the claw parts 11 of the lid part 10 are removed from the locking holes 3 of the battery case body part 2, and the lid part 10 is slid in a direction opposite to the direction of insertion so as to be separated from the battery case body part 2 as illustrated in FIG. 8B.

Figure 8C:
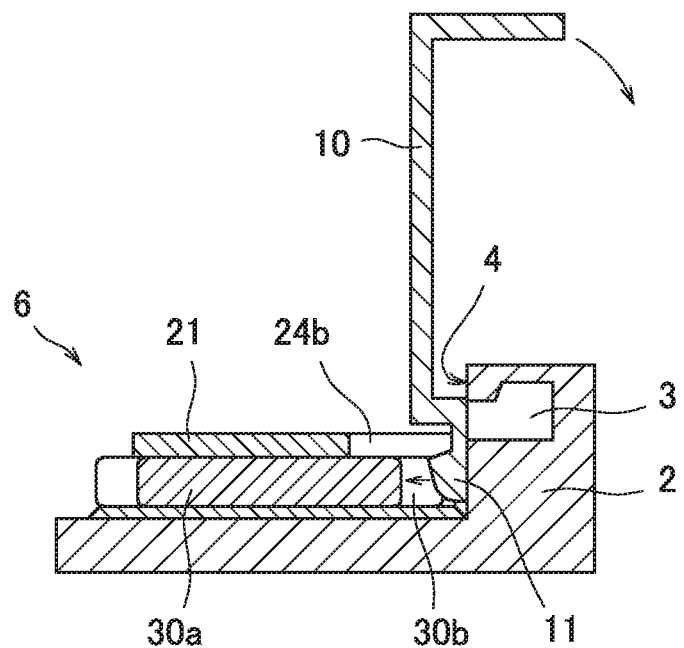
FIG. 8C is a cross-sectional view of the battery case according to the embodiment of the present disclosure taken along line A-A' illustrated in FIG. 4, illustrating the removal procedure of the battery using the lid part.
Figure 8D:
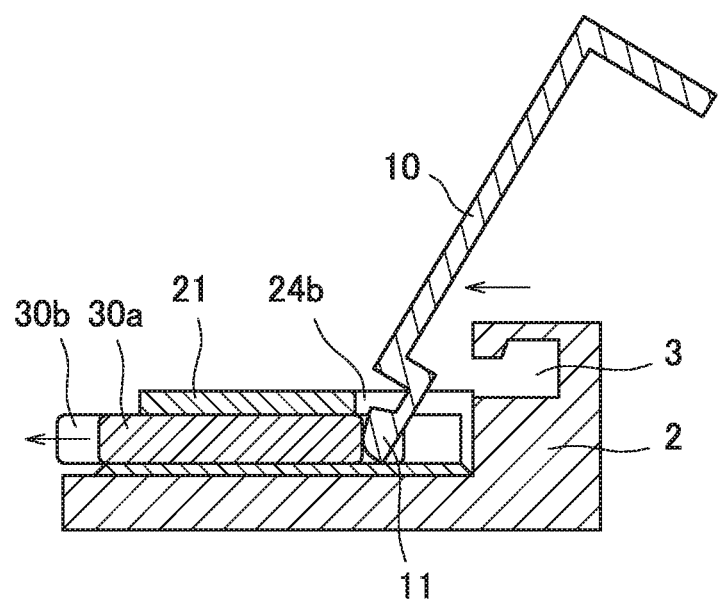
FIG. 8D is a cross-sectional view of the battery case according to the embodiment of the present disclosure taken along line A-A' illustrated in FIG. 4, illustrating the removal procedure of the battery using the lid part.

The two claw parts 11 of the separated lid part 10 are inserted in the spaces 5 which are surrounded by the inside surface 4 of the battery case body part 2 and a side surface 30b of the coin cell battery 30. At this time, the first holding part 21 having sufficiently large cut-outs 24b does not hinder insertion of the claw parts 11. Then, as illustrated in FIG. 8C, the lid part 10 is tilted so that the coin cell battery 30 is pushed out in the direction opposite to the direction of insertion. If the coin cell battery 30 does not reach the removable position, the coin cell battery 30 may be further moved by further pushing the lid part 10 (FIG. 8D).

As described above, the lid part 10 closes the opening 6 of the battery case body part 2 for accommodating the coin cell battery 30, and is fixed to the battery case body part 2 with the claw parts 11 disposed in the lid part 10, which enables prevention of movement and dropping-off of the coin cell battery 30 as well as damage caused by impact from an outside or the like. Furthermore, the claw parts 11 of the lid part 10 separated from the battery case body part 2 are inserted into the spaces 5 disposed in the battery case body part 2, the coin cell battery 30 is pushed out in the direction opposite to the direction of insertion, and thereby the coin cell battery 30 can be easily removed without a special tool.

In this way, a unique advantage in which there is provided the low-cost battery case which allows easy replacement of batteries and highly avoids malfunction caused by movement and dropping-off of a battery as well as damage caused by impact from an outside or the like can be obtained.

<Modification>

In the embodiment described above, the lid part 10 includes the two claw parts 11, and the locking holes 3 are disposed in two positions of the battery case body part 2. However, the number of the claw parts 11 is not limited to two, and may vary depending on the size (width) of the lid part. Such a case will be explained as a modification.

FIG. 9 is a plan view of a battery case body part with a single claw part 11. The locking hole 3 is disposed close to a center of the inside surface of the battery case body part, and the claw part 11 is formed in a position corresponding to the locking hole 3 in one side surface of the lid part 10. The space 5 and the cut-outs 24a of the first holding part 21 are also disposed close to and facing the locking hole 3.

This modification is suitable in a case where a size of the battery and a width of the lid part 10 are small. Also, in the modification, the unique advantage in which there is provided the low-cost battery case allowing easy replacement of batteries while avoiding malfunction caused by movement and dropping-off of a battery as well as damage caused by impact from an outside or the like can be obtained.

<Aspects of the Present Disclosure>

A first aspect of the present disclosure is directed to provide a battery case for accommodating a coin cell battery inserted thereinto in a sliding manner. The battery case includes: a battery case body part which includes an opening for accommodating the coin cell battery, and in which the accommodated coin cell battery is held; and a lid part which closes the opening of the battery case body part. The lid part includes a claw part which is fitted and inserted into the battery case body part upon closing of the opening, and with which the coin cell battery held in the battery case body part is pushed out in a direction opposite to a direction of insertion upon removal of the coin cell battery.

According to a second aspect of the present disclosure, in the first aspect described above, the battery case body part includes a locking hole in an inside surface thereof into which the claw part is fitted and inserted, and the claw part is included in one side surface of the lid part, wherein the lid part is slid along the opening, and the claw part is fitted and inserted into the locking hole, and thereby the lid part is fixed to the battery case body part.

According to a third aspect of the present disclosure, in the second aspect described above, in the battery case body part, a space which allows the claw part to be inserted thereinto is disposed facing the locking hole in the inside surface.

According to a forth aspect of the present disclosure, in the third aspect described above, the space in the battery case body part is large enough to allow the claw part to be inserted thereinto, and the held coin cell battery to be pushed out to a removable position in the direction opposite to the direction of insertion.

According to a fifth aspect of the present disclosure, in any one of the first to the forth aspects described above, the battery case body part further includes a battery holder which holds the coin cell battery and is integrally formed, and the battery holder includes a first holding part and a second holding part which hold the coin cell battery therebetween.

According to a sixth aspect of the present disclosure, in the fifth aspect described above, the first holding part is placed close to the lid part and includes a cut-out part which allows the claw part to be inserted thereinto in a state in which the opening is closed.

EXPLANATION OF REFERENCE SIGNS

1 Battery case
2 Battery case body part
3 Locking hole
4 Inside surface
5 Space
6 Opening
10 Lid part
11 Claw part
20 Battery holder
21 First holding part
22 Second holding part
23 Insertion opening
24a Cut-out (area)
24b Cut-out (side surface of the first holding part 21)
30 Coin cell battery
30a Coin cell battery (cross-section)
30b Coin cell battery (side surface)

The invention claimed is:

1. A battery case for accommodating a coin cell battery inserted thereinto in a sliding manner, the battery case comprising:
   a battery case body part which includes an opening for accommodating the coin cell battery, and in which the accommodated coin cell battery is held, the battery case body part including a space therein; and
   a lid part which closes the opening of the battery case body part, the lid part including a claw part in one side surface thereof configured to be inserted into a locking hole in the battery case body part, wherein the claw part of the lid part is configured to close the opening by inserting the claw part of the lid part into the locking hole of the battery case body part;

wherein the claw part of the lid part is configured to remove the coin cell battery held in the battery case main body by inserting the claw part of the lid part into the space and pushing out the coin cell battery in a removal direction opposite to an insertion direction of insertion of the coin cell battery into the battery case body part; and wherein:

the battery case body part further includes a battery holder which holds the coin cell battery and is integrally formed, and the battery holder includes a first holding part and a second holding part which hold the coin cell battery therebetween.

2. The battery case according to claim 1, wherein the locking hole is in an inside surface of the battery case body part, and wherein the lid part is slid along the opening, the claw part is fitted and inserted into the locking hole, and thereby the lid part is fixed to the battery case body part.

3. The battery case according to claim 2, wherein the space of the battery case body part is disposed facing the locking hole in the inside surface.

4. The battery case according to claim 3, wherein the space in the battery case body part is large enough to accommodate the claw part inserted thereinto and to allow the held coin cell battery to be pushed out in the direction opposite to the direction of insertion to move to a removal position.

5. The battery case according to claim 1, wherein the first holding part is exposed to the opening and includes a cut-out part which allows the claw part to be inserted thereinto.

6. The battery case according to claim 2, wherein the first holding part is exposed to the opening and includes a cut-out part which allows the claw part to be inserted thereinto.

7. The battery case according to claim 3, wherein the first holding part is exposed to the opening and includes a cut-out part which allows the claw part to be inserted thereinto.

8. The battery case according to claim 4, wherein the first holding part is exposed to the opening and includes a cut-out part which allows the claw part to be inserted thereinto.

* * * * *